(No Model.)
J. G. MATTHEWS.
PITCHFORK.
No. 585,393. Patented June 29, 1897.
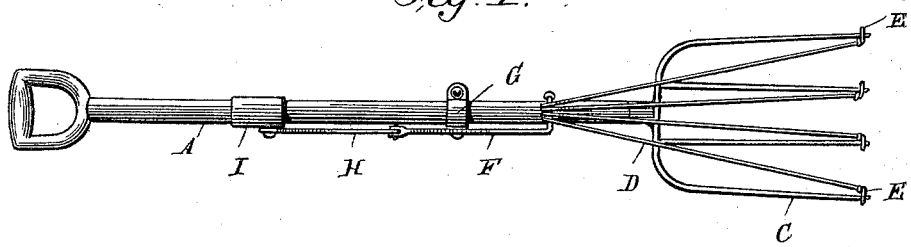
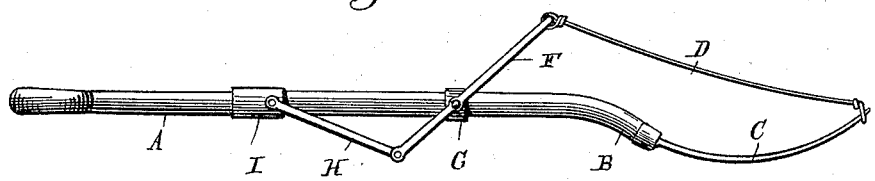
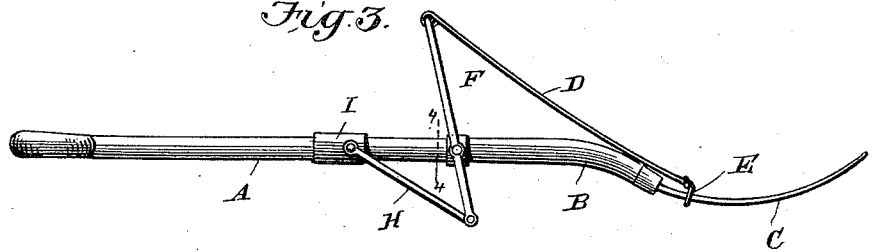
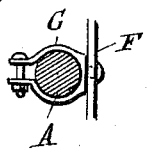
Witnesses
Inventor
James G. Matthews
by O'Meara & Lee
Attorneys

UNITED STATES PATENT OFFICE.

JAMES G. MATTHEWS, OF FAIRLAND, MICHIGAN.

PITCHFORK.

SPECIFICATION forming part of Letters Patent No. 585,393, dated June 29, 1897.

Application filed April 10, 1897. Serial No. 631,615. (No model.)

*To all whom it may concern:*

Be it known that I, JAMES G. MATTHEWS, residing at Fairland, in the county of Berrien and State of Michigan, have invented a new and useful Pitchfork, of which the following is a specification.

My invention has relation to certain improvements in forks, and more particularly to an attachment for pitchforks.

The object of the invention is to provide an attachment for pitchforks whereby any manure or other substance adhering to the tines thereof can be automatically cleared or removed therefrom.

Another object of the invention is to provide an improved attachment for pitchforks having an operating mechanism whereby the tines at the front portion of the fork can be cleaned at any time desired.

With these and other objects in view my invention consists of certain novel features of construction and in combinations and arrangements of parts, more fully described hereinafter and specifically pointed out in the claims.

Referring to the accompanying drawings, illustrating my invention, Figure 1 is a perspective view of the pitchfork, showing my improved attachment secured thereto. Fig. 2 is a side elevation of the fork. Fig. 3 is a similar view, the operating-rods being in a closed or folded position. Fig. 4 is a cross-sectional view on the line 4 4 of Fig. 3.

The same letters of reference will indicate like parts throughout the different views.

In carrying out my invention and in order to illustrate the same I have shown a pitchfork having the usual stock portion or handle part A, the same being curved downwardly, as shown at B, at the front portion thereof, so as to receive tines or prongs C. These tines or prongs are secured to the front portion of the stock or handle in any desirable manner.

D indicates a series of bars having the front looped portion E, adapted to be freely slidable upon the tines or prongs of the fork. Should the front portion of the fork contain, say, four prongs or tines, a corresponding number of these bars D will be employed to slide back and forth upon the same.

F indicates a bar or lever connected to the rear end of the bar D, the same being pivoted at about its central portion to the handle of the fork by means of a guide-clamp G, secured thereto, and to the lower end of the lever F is secured a shorter arm H, which is pivotally joined to a sleeve or collar I, that is freely movable upon the handle portion of the fork, it of course being understood that the several parts constituting the lever-operating mechanism are pivotally connected together, as clearly shown.

It is a well-known fact that in handling manure, especially cornstalk manure, certain particles thereof will adhere to the tines or prongs of the fork after the same has been pitched, thereby oftentimes clogging the spaces between said tines or prongs. By means of my improved attachment should anything adhere to the prongs or tines the same can be readily removed therefrom.

In operation the fork is used in the ordinary manner, and should there be no necessity of clearing the tines the parts will assume the position shown in Fig. 3. Should any manure, corntalks, or the like adhere to the tines or prongs while the fork is being used, the collar or sleeve can be forced or pushed rearwardly on the handle portion of the fork and by means of the pivoted levers the bar D will be forced forwardly over the tines or prongs, the front looped portion thereof clearing said tines or prongs of any foreign substance that may have adhered thereto. After the tines have been cleaned the collar or sleeve I can be pushed forward on the handle portion, which will draw the rod D back to its normal position, and the device will then again be ready for use.

The invention is very simple in construction and composed of but few parts, and by reason of its peculiar construction I am enabled to more handily use the device for the purpose intended.

Various slight changes might be made in the forms, constructions, and arrangement of the parts described without departing from the spirit and scope of my invention. Hence I do not care to limit myself to the exact construction and arrangement set forth, but consider myself entitled to any slight changes that might fall within the spirit and scope thereof.

Having thus described my invention, what

I claim as new, and desire to secure by Letters Patent, is—

1. An attachment for pitchforks consisting of a series of levers pivoted as described to the handle portion of said fork, the operating sleeve or collar freely slidable on the rear portion of the handle and the front bar having the looped end adapted to be operated by said levers and be freely movable on the tines or prongs of the fork, substantially as shown and described.

2. A pitchfork having the stock or handle portion and the curved front part carrying the tines, a series of pivotal levers attached to the handle portion and carrying a front rod having the looped end, a collar or sleeve secured to the rear lever, the same being adapted to freely slide back and forth on the handle portion, substantially as set forth.

JAMES G. MATTHEWS.

Witnesses:
WM. MATTHEWS,
FREDK. SCHWARTZ.